Nov. 18, 1941.   J. V. N. DORR ET AL   2,263,167
SEDIMENTATION
Original Filed June 8, 1935   2 Sheets-Sheet 1

INVENTORS,
JOHN V. N. DORR,
WILLIAM C. WEBER,
GEORGE M. DARBY,
ELLIOTT J. ROBERTS,
BY Austin Middleton
ATTORNEY.

Nov. 18, 1941.  J. V. N. DORR ET AL  2,263,167
SEDIMENTATION
Original Filed June 8, 1935  2 Sheets-Sheet 2
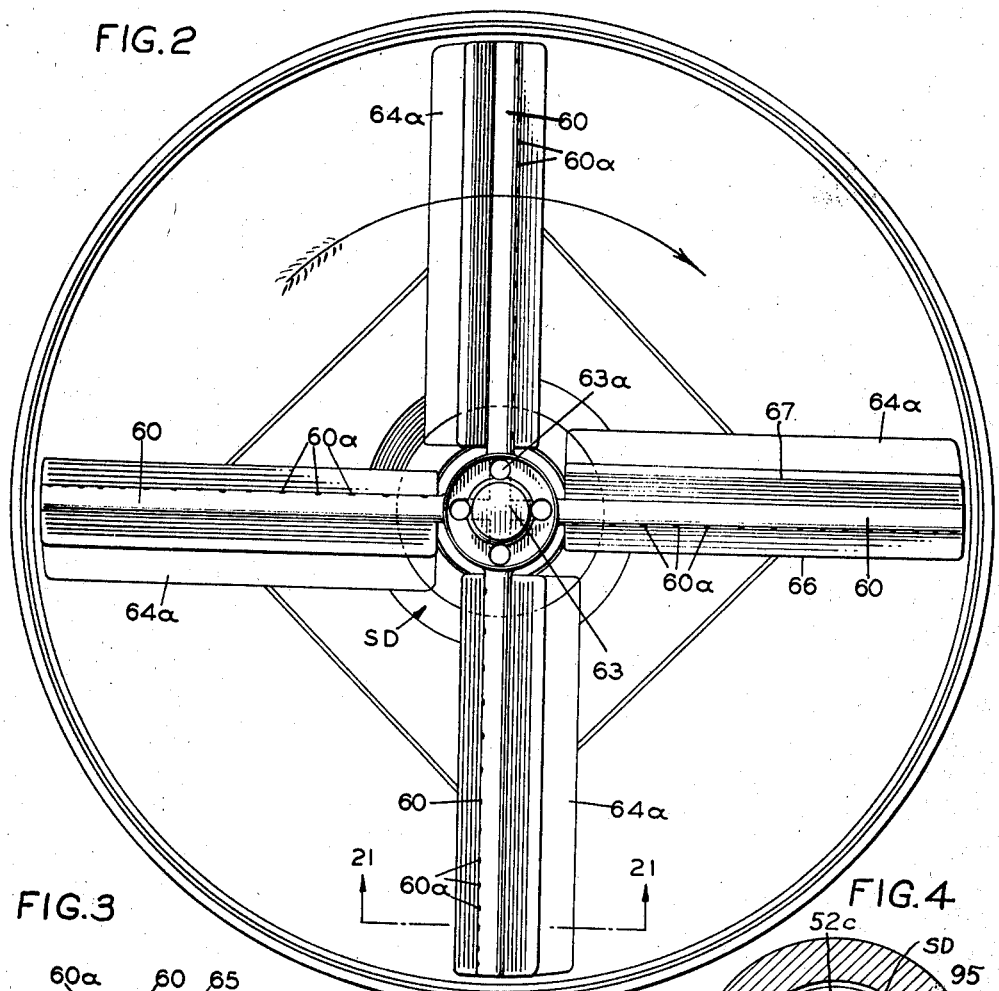
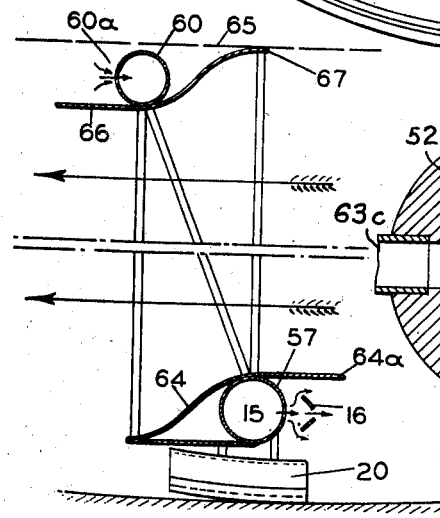
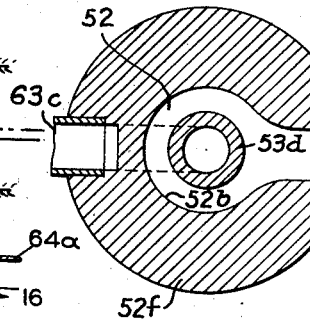
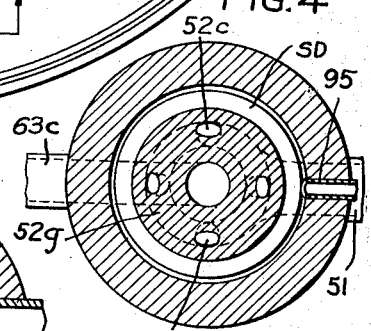
INVENTORS,
JOHN V. N. DORR,
WILLIAM C. WEBER,
GEORGE M. DARBY,
ELLIOTT J. ROBERTS,
BY Arthur Middleton
ATTORNEY Patented Nov. 18, 1941

2,263,167

UNITED STATES PATENT OFFICE 2,263,167

SEDIMENTATION

John V. N. Dorr, William C. Weber, George M. Darby, and Elliott J. Roberts, Westport, Conn., assignors to The Dorr Company, Inc., New York, N. Y., a corporation of Delaware Original application June 8, 1935, Serial No. 25,584. Divided and this application July 22, 1939, Serial No. 286,022

9 Claims. (Cl. 210—55)

This patent covers material carved out or divided from our main patent application, Serial No. 25,584, filed June 8, 1935 that matured on January 2, 1940 into Patent No. 2,185,785. The application of said patent is based mainly on a manner or process of operating sedimentation apparatus. Several embodiments or forms of apparatus for realizing the process or invention of said patent are shown therein as well as in application therefor as originally filed.

One typifying form of apparatus illustrated in said main patent application constitutes the basis hereof. To that end there is selected and adopted as illustrative of the invention of which the present patent is directed and as the foundation for the present patent, that form or embodiment of apparatus illustrated by Figs. 19, 20 and 21 of the main patent application. Said figures have been duplicated or reproduced herein. The detailed description hereof is in substantial accordance with that found in the main patent application. There is also included herein an expanding statement or elucidation of certain advantages to be derived from or inherent to the apparatus shown by reproduced figures hereof.

The invention which is the basis of the present patent relates to sedimentation apparatus having a circularly-raked or round type of settling tank into the liquid-holding portion of which a body of liquid-solids mixture is held while undergoing quiescent sedimentation.

The apparatus of the present invention embodies a suitable feeding means by which liquid is supplied to and delivered within the liquid-holding section of the tank, and effluent offtake means by which supernatant liquid is received and passed from the upper interior portion of the tank and a sediment-engaging or transfer means operable for moving material which has settled into the lower portion of the tank.

The apparatus has a stationary central supporting structure or pier rising from the tank bottom. This pier is embodied so as to realize a novel arrangement with respect to the rest of the stationary structure of the tank. In the apparatus or sedimentation unit hereof there is also attained a novel arrangement, association and disposition of parts respecting the pier, the liquid supplying and distributing means, the supernatant liquid withdrawing or effluent discharge means, and the sediment-transfer means.

A novel feature of the invention also relates to a constructional arrangement wherein a horizontal influent pipe section beneath the settling floor of the tank leads to and delivers into an annulate type of initial receiving chamber, pocket, or cavity that is provided in the bottom structure of the tank about a lower portion of the pier or column and according to the arrangement shown. The influent receiving chamber or cavity is relatively large as compared with the cross-sectional flow area of the influent pipe section leading to and delivering thereinto whereby there is a slowing down of the flow velocity or lessening of the momentum thereof within and throughout the chamber and whereby there is a relatively uniform upward delivery of liquid therefrom into the liquid-holding region within the tank.

The invention has been illustrated in the accompanying drawings in which Fig. 1 shows a vertical sectional view of one form of apparatus embodying the present invention.

Fig. 2 shows a plan view of the apparatus of Fig. 1.

Fig. 3 is a vertical sectional view taken as on the vertical plane indicated by lines 21—21 of Fig. 2 looking in the direction of the arrows.

Figure 1:
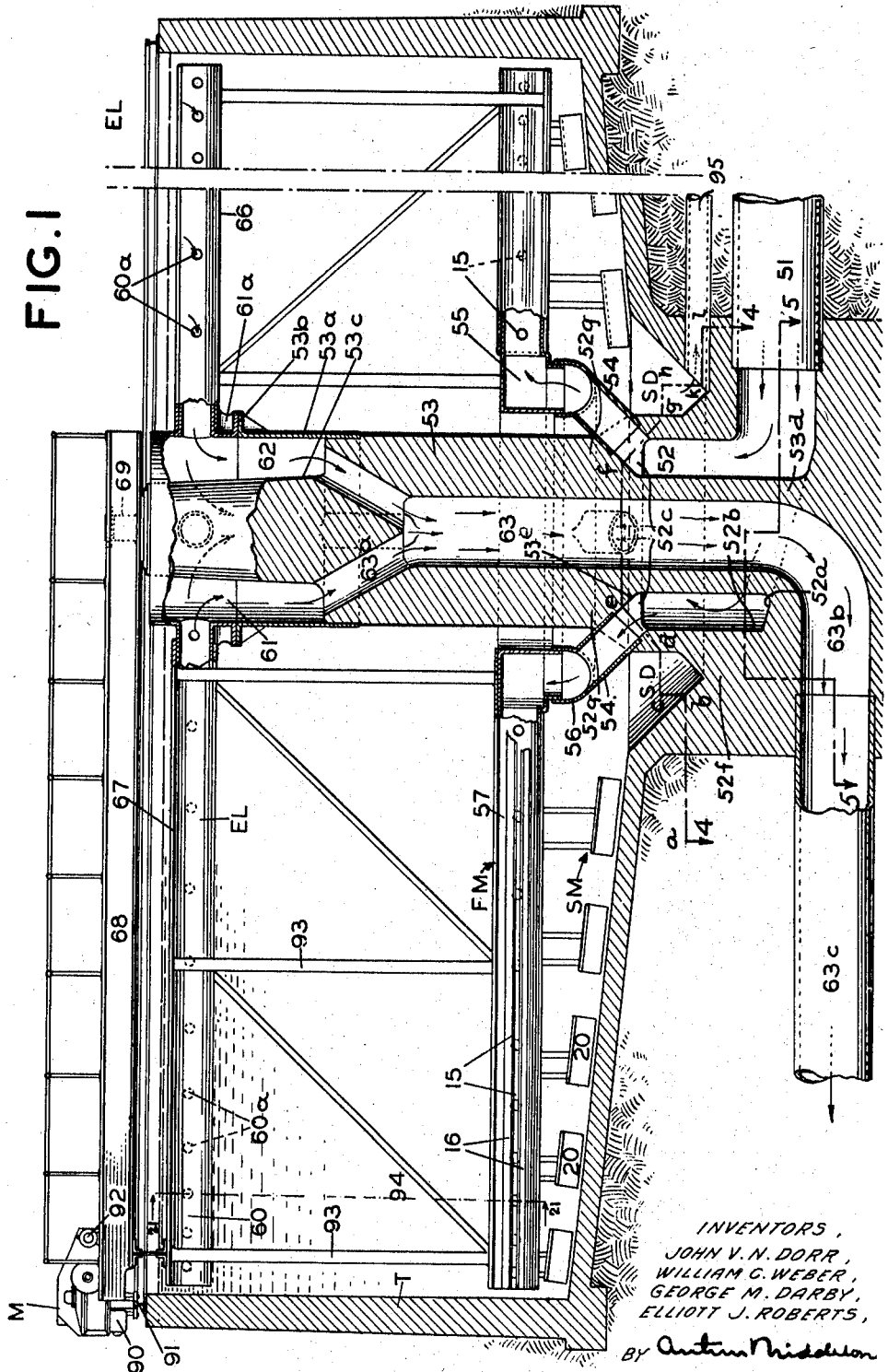

Fig. 4 is a horizontal sectional view of the structural parts in the vicinity of the lower portion of the pier that rises from the tank bottom; this view is taken as indicated by the horizontal lines a—b, c—d, e—f, g—h, and k—l and by the conic section indicated by the inclined lines d—e and f—g which are equally spaced from an axial center of the conic section, and all of which thus designated lines are included in and by the broken line 4—4 of Fig. 1.

Fig. 5 is a sectional horizontal view taken in Fig. 1 along the line 5—5 below the section line 4—4.

In the figures hereof T designates a sedimentation tank or basin; SM designates sediment raking and collecting mechanism; FM designates feeding means by and according to which liquid supplied thereto—to wit, liquid-solids mixture to be subjected to sedimentation—is delivered to and distributed within the liquid-holding section of the tank or basin T; EL designates an effluent overflow means by which supernatant liquid is withdrawn or passed—as clarified effluent—from the upper surface section of the body of liquid undergoing sedimentation within the tank; and SD denotes the section by which the settled solids transferred thereto are discharged from the tank.

The sedimentation tank T is provided with a rotatable member or mechanism that derives support from the pier. In the construction shown the rotatable mechanism includes or provides certain members of the sludge-raking or collecting mechanism SM, of the liquid-solids feed or distributing mechanism FM, and of the effluent withdrawal means EL.

The liquid to be subjected to sedimentation is supplied through a lower conduit section or bight portion 51 of an inverted siphon supply conduit that has an upstanding delivery leg portion or section 52 which is provided with an annularly shaped section in the lower portion of a central pier 53. The central pier is stationary and extends upwardly from the initial portion of the floor or bottom portion of the tank structure. There extend upwardly from the annular portion or section 52 delivery pipes or branches 54 through and from which the incoming liquid passes into a stationary sealing member plate or ring 56, thence into a rotatable annularly shaped member 55 surrounding the pier 53. The rotatable member 55 has a circularly or annularly shaped section open at the bottom thereof that is covered or in effect closed by an underlying cooperating member, to wit, the stationary sealing member or ring 56 previously referred to. The stationary member 56 may be viewed as a flange member having overlapping arrangement with the horizontally-turnable annular member 55 and is constructed so as to provide a stationary element of a sealing construction between the stationary branch pipes 54 on the one hand and the rotatable annularly shaped member 55 on the other hand. The annular member 55 constitutes a main ring or main body member of the composite rotatable member heretofore referred to, and thereto there are connected and therefrom there extend radial feed distributor pipes 57 having orifices or orificed portions 15. These orifice portions are arranged for effecting relatively uniform discharge and distribution of the fed solid-liquid mixture per unit of settling area in the receiving zone therefor, and which zone is located in and extends transversely across—in fact, horizontally across—the lower sedimenting section of the sedimentation tank. These distributing pipes 57 serve, or may serve, as carrying arms for the sludge rakes or scrapers 20 whereby as the composite rotatable member turns there is effected a collecting of sedimented solids and the ultimate transfer of the same to and into sludge discharge section SD from which the thus collected solids are ultimately delivered through sludge discharge pipe 95 under controlled conditions to the exterior of the tank or sedimentation basin. At the upper portion of the rotatable member there are connected and carried radially and horizontally-extending effluent receiving pipes or conduits 60 having effluent inflow openings 60a. These pipes or conduits 60 function to receive effluent—as clarified liquor—and to conduct the effluent received thereby radially inwardly and to ultimately deliver the thus conducted effluent into a centrally located receiving section provided by a rotatable hollow drum 61. The stationary pier 53 carries or has an annular or ring section 53a having an annular bearing and sealing ring portion 53b upon and with which a cooperative bearing and sealing ring portion 61a of the hollow drum seals and registers. The effluent passing into and from these effluent collecting pipes 60, is received in a space 62 between the inner wall of the drum or hollow member 61 and the inner wall of the ring or section 53a on the one hand and an outer portion of a smaller central upstanding projection 53c of the pier 53 on the other hand.

Therefrom it ultimately passes downwardly through branch conduits 63a leading to a lower central delivery conduit 63 that continues downwardly through the lower central portion of the pier, thence extends outwardly to the exterior of the tank through the conduit portions 63b and 63c.

In the instance of this arrangement, the distributing pipes 57 (see Fig. 3) are arranged so that the orifice portions 15 thereof extend, or tend to deliver, rearwardly trailingly from the forward horizontal circular path of travel of the pipes 57 which constitute carrying arms for the rakes 20. A streamlining construction 64 is provided for the pipes 57 in order to prevent any undue agitation incident to the forward rotary movement thereof of the distributing and carrying arms. The streamlining construction 64 comprises not only the gradually increasing wedge shaped section shown but also a part or section that provides a rearward extension or cover 64a which is provided for additionally preventing a sudden or undue rise of the distributed solid-liquid mixture immediately upon its delivery from the distributing pipe 57. The intake launder or pipe 60 is also provided with a streamlining construction 65 that includes a forwardly extending or leading portion 66 which facilitates the collecting of the clarified effluent, and the rearwardly extending, upwardly sloping portion 67 which avoids objectionable agitation and eddy currents in the wake of the forwardly travelling effluent collecting pipe.

According to the preferred arrangement as shown in Fig. 3, it is to be noted that the effluent launder 60 in the point of travel slightly precedes the deposit of sedimented solids by the feed or distributing pipe or conduit 57, or from another point of view—the effluent launder falls nearly a full, but not quite a full, revolution behind the feed distributing pipe to which it corresponds, thereby avoiding any tendency of short-circuiting of unsedimented liquid upwardly into and through the effluent launder construction.

It will be noted from the foregoing that the feed distributing point is pointed backward or, in other words, the feed or distribution of solid-liquid mixture is rearwardly in respect to the direction of rotation for the feed pipe 57, while the effluent or take-off pipe points forward, viz., is positioned so that the section having the liquid receiving openings is foremost and moves forwardly into the quiescent liquid to be removed thereby. The delivery orifices or collecting openings in each of these ducts should be spaced in accordance with the available settling area.

The streamlining as applied to the feed distributing and effluent collecting pipes, is arranged in a complementary manner in respect to each other and, by the mode of distribution herein described, a layer of fed solid-liquid mixture is laid down at each rotation of the feed arm and an equally thick layer of effluent liquid—clarified liquid—is skimmed off at the top of the tank.

Any suitable means may be employed for turning the rotatable member as a whole about a vertically-extending centrally located axis. A tractor mechanism, as for example a tractor mechanism comprising an arm or bridge 68 and motor M is indicated in Fig. 1. The inner end of this arm or bridge is mounted on a centrally located trunnion or bearing pin member 69 which in turn is carried on and by the central pier or column. The outer end of the arm embodies or is mounted on a wheeled truck 90 that is driven by the motor and which is supported on and is driven along a rail or track 91 that is provided at and along the top of the upstanding peripheral wall of the tank. Any suitable driving connection may be provided as at 92 whereby as the outer end of said arm or bridge 68 travels along a peripheral path as defined by the rail, there is imparted the requisite rotary movement to the composite rotary mechanism that includes the raking mechanism SM, the feed mechanism FM and the effluent launder construction EL. The main bearing for this composite rotatable mechanism may be that provided at and by the members or sections designated 53b and 61a. Suitable bracing or truss elements for the main components of the rotatable mechanism are provided and certain of said members are indicated as by parts such as 93 and 94.

The rotatable launder has the beneficial advantage of progressively skimming the entire successive sections of the entire upper portion of the body of sedimenting liquid. It is feasible to provide the sedimentation basin with a rotating member having a single feed distributing arm and an associated single effluent receiving or collecting arm. It is also feasible to have a rotatable construction which will have a multiplicity of the feed distributing arms and a multiplicity of effluent receiving or collecting arms, and it will be noted that in the arrangement shown four sets of these arms have been employed.

From a functional aspect, it will be observed in the drawings hereof that the sediment raking or impelling mechanism derives support (through pivot 69) from the structure of the pier or column 53; that the tank bottom has a settling floor area on which sediment deposits and over which the sediment rakes 20 operate to impel the sediment to the sludge- or sediment-sump SD that is associated with the tank floor; that the influent pipe 51 that is disposed substantially horizontally has a section thereof lying beneath or below the tank floor and delivers or feeds incoming liquid into space 52 that is substantially vertically disposed and constitutes an initial feed liquid receiving chamber, space or cavity that extends into the tank bottom and which is of an area that is obviously larger than the cross sectional area of the feed pipe 51 for the purpose of stilling somewhat the momentum of the liquid entering into that space from the feed pipe; that the space 52 may be viewed as an expansion space that initially receives liquid from the feed pipe 51; that the pier structure has or embodies at the base or lower portion thereof a vertically-extending section 53d which is surrounded or encircled by the expansion chamber or initial feed-receiving space 52 and in this connection it will be noted that the vertically-extending section 53d of the pier is sometimes referred to as a lower centrally-located pier section because of its being located within the lower portion of the tank and because of its being encircled by the expansion chamber 52; that the receiving space 52 is primarily substantially annular in plan; that said space 52 may be viewed as provided by a depression in the tank bottom, or as otherwise expressed, it may be described as having (a) an inner border defined by a centrally disposed structural part provided by the lower portion 53d of the pier 53; (b) an outer border or upright marginal wall 52b defined by the surrounding portion 52f of the tank bottom; (c) a lower surface or floor portion 52a defined by the underlying portion of the tank bottom proper, which floor portion 52a just referred to slopes forwardly and upwardly until it joins the marginal wall 52b in a cornered manner; and (d) a roof or ceiling portion defined by a roof structure comprising roof elements or sections 52e spanning the space between the upper portion of the marginal wall 52b and the pier 53, which roof structure is provided with upflow openings 52c leading from the upper portion of the expansion chamber 52. From the drawings it will also be noted that the feed supplying and distributing means as a whole also includes a stationary trough-shaped annular member 56 which encircles or surrounds the pier structure 53; that the trough of this annular member 56 is U-shaped in vertical cross-section; that this annular member 56 has or is provided with upflow pipes or branch conduits 54; that these upflow pipes or branch conduits 54 register with the openings 52c provided in the roof of the expansion chamber 52 whereby liquid from the expansion chamber is directed and passed into the trough-shaped member 56 from which it is emitted into the horizontally-turnable annular member 55 for ultimate delivery and dispersion into the region outside of the pier and particularly into the body of liquid undergoing treatment within the tank.

The feed operation of this apparatus is that the incoming liquid from the pipe 51 that lies below the sediment collecting floor of the tank feeds to the chamber 52 wherein the direction of the flow is changed to be upward while its momentum is decreased because of the fact that the chamber 52 while being annulate in type is in effect an expansion zone. The liquid flows upwardly in encirclement of the pier structure and is conducted by the pipes or conduits 54 and stationary annular member 56 to the horizontally-turnable feed distributing element 55 that surrounds the pier, and from which the feed is emitted for delivery to the liquid body in the tank from a region outside of the pier. Thus the feed comes in at the bottom of the tank in a manner that surrounds the pier and is emitted into the tank from outside of the pier.

As has already been pointed out in respect to certain broad aspects of the invention an important feature thereof revolves about the initial receiving chamber or cavity—

(a) Which receives liquid solids mixture passed thereto and delivered thereinto by and from a low influent conduit section reaching below the settling floor of the tank bottom;

(b) Which is embodied or provided in the tank structure about or externally with respect to a low central portion of the pier or column;

(c) Which has upwardly-extending flow passage area leading and opening therefrom and (d) Which has an annulate type of flow emitting passage or terminal area from which the upflowing liquid passes on its way for ultimate distribution within the sedimentation tank.

The important features of the broad aspect just referred to are concerned with the initial feed receiving pocket or cavity disposed, located and embodied in the tank structure and particularly its disposition with respect to the tank bottom and the pier rising therefrom and the novel features of this arrangement have broad application regardless as to whether or not means having distributing arms or some other form of liquid distribution is employed.

It will be noted (a) that the annulate initial receiving space or cavital pocket 52 is conjointly provided by the tank bottom and the pier rising therefrom and is symmetrically disposed about the low vertically-extending central section or portion 53$^d$ of the pier 53; (b) that the branch pipes 54 leading upwardly to the trough-shaped annular member 56 are symmetrically disposed about the pier and complete upflow passageways that also include as part thereof the upflow openings 52$^c$ in the ceiling structure of the initial receiving or expansion space 52; and (c) that the upflow conduits or passageways thus provided by the upflow openings 52$^c$ and the branch pipes 54 conduct the inflowing liquid upwardly from the initial liquid-receiving or expansion space 52 into the stationary trough-shaped annular member 56 from which it is guidedly delivered into the annular horizontally-turnable member 55 for ultimate distribution as through the apertured arms 57 leading therefrom and by which the incoming feed is submergedly delivered into the liquid-holding section of the tank.

We claim:

1. An apparatus for separating suspended solids from liquids comprising a tank providing therein a sedimentation compartment and having a sediment discharge leading from the lower portion thereof, a stationary feed portion, a stationary effluent withdrawal portion, and rotatable means operable within said compartment for mechanically impelling solids settled therein to the sediment discharge; said apparatus having a deeply submerged feed distribution pipe operatively associated with the stationary feed portion and also having a shallowly submerged effluent off-take pipe operatively associated with and leading to the stationary effluent withdrawal portion, which said pipes are connected to and are rotatable with the aforesaid rotatable means.

2. An apparatus as defined in and by claim 1, wherein the feed distribution pipe has discharge openings in the trailing portion thereof and the effluent take-off pipe has receiving openings in the leading portion thereof.

3. An apparatus as defined in and by claim 1, wherein the feed distribution pipe and the effluent off-take pipe are vertically spaced one from another and are disposed so that each extends outwardly with respect to a vertically-extending axis about which it is rotatable, wherein the feed distributing pipe is provided with a forwardly disposed wedge-shaped section serving as a streamline portion, and wherein the effluent off-take pipe is provided with a rearwardly and upwardly-extending section serving as a streamline portion.

4. For use in a sedimentation basin, a combined liquid feeding and clarified effluent discharging device comprising upper and lower pipes horizontally-turnable in paths about an upwardly-extending axis and extending outwardly with respect to said axis, means for rotating said pipes about said axis, and associated stationary means embodying an inflow section providing an influent duct and an outflow section providing an effluent duct; a lower one of said pipes being operatively associated with the influent duct of said inflow section and having normally submerged feed discharge openings disposed along the same for constituting a distribution feed pipe that functions within the sedimentation basin near the bottom thereof and an upper one of said pipes being operatively associated with the effluent duct of said outflow section and having intake openings therealong and constituting an effluent outflow pipe for functioning in the upper portion of the basin for determining the operative level of the body of liquid within the basin; said lower pipe having a wedge-shaped member at the forward portion thereof and a plate extending rearwardly from the upper portion thereof; and said upper pipe having a plate extending forwardly from the lower portion thereof and with a member extending upwardly and rearwardly from the lower portion thereof.

5. In a decanting settling unit adapted to contain a body of liquid, a tank having a bottom providing a settling floor, a marginal wall rising from said bottom, effluent overflow means fixing the normal liquid level within the tank, a pier rising from the bottom of the tank, means for passing sedimented material from the floor to the exterior of the tank, an annulate initial receiving space conjointly provided by the tank bottom and pier rising therefrom and disposed about a lower vertically-extending portion of the pier, means for feeding liquid comprising a low pipe section extending inwardly beneath the floor and delivering into said annulate receiving space, a motor actuated feed distributing means that derives support from the pier and which includes a liquid distributing member turnable about the pier, and means for conducting liquid from the initial receiving space to the turnable distributing member.

6. A decanting unit comprising a sedimentation tank having a marginal wall, a bottom portion providing a settling floor, effluent overflow means fixing the normal level of the liquid within the tank, a vertically-extending axial member centrally disposed with respect to the marginal wall, an annulate type of feed receiving and expansion chamber provided within the tank bottom about a lower section of said axial member, a pipe whose cross-sectional flow area is small compared with the horizontal cross-sectional area of the expansion chamber and providing for delivering influent liquid into said chamber, a feed distributing element deriving support from said axial member and horizontally-turnable thereabout means through which influent is passed from said expansion chamber into said feed distributing element, and means for imparting turning movement to the feed distributing element.

7. A decanting settling tank having a bottom portion providing a settling floor, a wall rising from the bottom and with the bottom defining the lower and marginal limits of a liquid-holding zone, a pier rising from said bottom, an initial feed receiving and expansion space for the bottom about a lower section of the pier and provided by the bottom and the pier, means for feeding liquid to the tank comprising a low pipe extending inwardly below the floor of the tank, connected to said bottom and delivering directly into said feed expansion space, a feed distributing element deriving support from said pier, means associated with said expansion space and with said distributing element and providing upflow passage area for conducting liquid from said feed expansion space upwardly to said feed distributing element preparatory to its ultimate passage therefrom into the liquid-holding zone, and means for turning said feed distributing element about said pier, the flow area of said feed receiving and expansion space being substantially larger than the flow area of the low pipe.

8. In a decanting settling unit a liquid-holding tank having a bottom providing a settling floor, a marginal wall rising from the bottom, conduit means for passing sedimented material from the lower interior portion of the tank to the exterior of the tank, a pier structure in the tank and rising from the bottom of the tank, a liquid-receiving and expansion space conjointly provided by the tank bottom and the pier whereby it is within said bottom and about a low section of the pier, a liquid-distributing member encircling the pier, a low feed pipe extending inwardly beneath the tank floor, connected to the tank bottom and delivering into said expansion space, and means by which liquid received in the expansion space is upwardly directed therefrom into said liquid-distributing member.

9. A decanting settling unit comprising a tank adapted to contain a body of liquid and having a bottom providing a settling floor, a marginal wall rising from the bottom, effluent overflow means fixing the normal liquid level within the tank, means for passing sedimented material from the tank, a pier rising from the tank bottom and having a low section providing a vertically-extending face portion, an initial feed receiving space provided in the tank bottom and defined in part by an upstanding wall provided by a section of the tank bottom and in part by said face portion of the pier, means for feeding liquid to the tank comprising a low pipe section extending inwardly beneath the tank floor and delivering into said feed receiving space, a mechanically-actuated feed distributing member turnable about the pier, and means for upflowing liquid from said feed receiving space into the turnable feed distributing member.

JOHN V. N. DORR.
WILLIAM C. WEBER.
GEORGE M. DARBY.
ELLIOTT J. ROBERTS.